United States Patent [19]

Marsh

[11] 4,153,761

[45] May 8, 1979

[54] METHOD OF REMOVING FOULANTS FROM ION EXCHANGE RESINS

[75] Inventor: Daniel G. Marsh, Monmouth County, N.J.

[73] Assignee: The United States of America as represented by the Secretary of the Army, Washington, D.C.

[21] Appl. No.: 899,034

[22] Filed: Apr. 21, 1978

[51] Int. Cl.² .............................................. B01D 15/06
[52] U.S. Cl. ........................................ 521/26; 210/32
[58] Field of Search ................... 134/2; 210/29, 30 R, 210/32, 63 R, 63 Z; 521/26

[56] References Cited

U.S. PATENT DOCUMENTS

| 3,253,920 | 5/1966 | Rees et al. | 521/26 |
| 3,536,637 | 10/1970 | Noll et al. | 521/26 |
| 3,669,631 | 6/1972 | Dietrich et al. | 210/32 |
| 3,787,339 | 1/1974 | Hodgdon et al. | 210/32 |
| 3,791,866 | 2/1974 | Kunin et al. | 210/63 R |
| 3,909,403 | 9/1975 | Abe et al. | 210/32 |
| 3,932,278 | 1/1976 | Meidl et al. | 210/63 Z |

FOREIGN PATENT DOCUMENTS 600303  6/1960  Canada ...................................... 521/26

Primary Examiner—Charles N. Hart
Assistant Examiner—Ivars Cintins
Attorney, Agent, or Firm—Nathan Edelberg; Sheldon Kanars; Roy E. Gordon

[57] ABSTRACT

Foulants are removed from ion exchange resins by treating the foulant coated ion exchange resin with a weak aqueous solution of a compound that quickly decomposes the foulants.

7 Claims, No Drawings

METHOD OF REMOVING FOULANTS FROM ION EXCHANGE RESINS

The invention described herein may be manufactured, used and licensed by or for the Government for governmental purposes without the payment to us of any royalty thereon.

BACKGROUND OF THE INVENTION

This invention relates in general to a method of removing foulants from ion exchange resins and in particular, to a method of removing foulants from an ion exchange column.

STATEMENT OF THE PRIOR ART

The build up of foulants on ion exchange resins limits the reuse of the resin. By chemically converting the foulants to compounds that can be easily removed, the resin can be reused. The procedure that has normally been used for the regeneration of ion exchange columns is an ion replacement reaction. Typically, the ion exchange resin has a charged site and a counter charged ion on that site. During resin use, the counterions are replaced by ions removed from the fluid passing through the resin. These new molecules are then typically removed by a mass action effect using a solution of the original counterion or some similar counterion.

Occasionally the ions removed from fluid being treated are so strongly attached to the resin active sites that mild conventional ion displacement reactions cannot be used to remove them. The solution to some of these cases is to use a stronger regenerant compound or a more concentrated solution of regenerant to knock off the attached ion. Unfortunately, these approaches either may not remove the bound ion or may cause the bound ion to change to a compound even more difficult to remove. An example of the former problem is the organic fouling of anion exchange resins by such compounds as humic and tannic acids. An example of the latter problem is the fouling of anion exchange resins by attempting to apply conventional regeneration techniques on resin used to treat photographic processing waste water, resulting in the precipitation of solids in the resin.

SUMMARY OF THE INVENTION

The general object of this invention is to provide a method of removing foulants from ion exchange resins. A further object of the invention is to provide such a method in which the foulant will be quickly decomposed. A particular object of the invention is to provide such a method for removing foulants from an ion exchange column.

It has now been found that the foregoing objects can be attained by treating the foulant coated ion exchange resin with a weak aqueous solution of a compound that quickly decomposes the foulant.

The weak aqueous solutions that are effective as the treating agents of the invention are generally less than 10 percent aqueous solutions of a mild oxidizing compound such as hydrogen peroxide, ozone, or sodium peroxide. Particularly desirable results have been obtained using a three percent aqueous solution of hydrogen peroxide.

DESCRIPTION OF THE PREFERRED EMBODIMENT

An anion exchange column is subjected to foulant buildup from photographic waste waters. An attempt is made to regenerate the column by treatment with ammonium chloride. However, the column has a limited reuse life because the ions that are not removed by the regenerant are retained on the column and thus reduce the column's exchange capacity on subsequent cycles. Use of stronger solutions and counterions fail to remove these compounds believed to be polythionates and quinone/quinoneoid products. For example, the use of sodium hydroxide, the most common of the regenerants, results in the formation of solids in the resin pores resulting from the reaction of the foulant ions with the sodium hydroxide. When an attempt is made to decompose the foulants using a three percent aqueous solution of hydrogen peroxide it is successful. That is, when such a treating agent is added to the column, the polythionates and quinone/quinoneoids are converted to sulfate, water, and carbon dioxide according to the reactions:

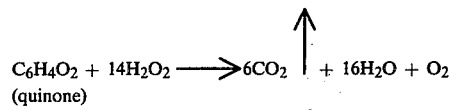

and

These reaction products are easily removed from the column by conventional techniques and the column recovers its original capacity.

Thus, in the method of this invention, ions which remain on the column after conventional resin regeneration are converted to components which are very easily removed from the column. While conventional techniques are limited in their ability to return the column to its original condition, the on column or in situ destruction of foulants of this invention allows the return of the ion exchange resin to its original capacity.

The method of the invention is not only applicable to all ion exchange columns but also to the other forms in which ion exchange resins are found such as in a membrane, in batch form, as a belt, etc.

The method of the invention further works equally well with cation exchange resins or anion exchange resins.

Furthermore, there are currently many ion exchange applications where the use of the resin is limited by compounds irreversibly bound to the resin active sites. Current techniques require pretreatment of the effluent to remove these compounds. In many of these cases, as for example in the organic fouling of anion exchange resins used to reduce the total dissolved solids of municipal waters, the use of on column conversion of the fouling molecules could be a desirable alternative to pretreating large quantities of water.

I wish it to be understood that I do not desire to be limited to the exact details as described for obvious modifications will occur to a person skilled in the art.

What is claimed is:

1. Method of removing foulants from ion exchange resins in situ consisting of treating the foulant coated resin with a less than 10 percent aqueous solution of a mild oxidizing compound selected from the group consisting of hydrogen peroxide, ozone and sodium peroxide.

2. Method according to claim 1 wherein said solution is a three percent aqueous solution of hydrogen peroxide.

3. Method according to claim 2 wherein said ion exchange resin is an anion exchange resin.

4. Method according to claim 2 wherein said ion exchange resin is a cation exchange resin.

5. Method according to claim 1 wherein said ion exchange resin is an anion exchange resin.

6. Method according to claim 1 wherein said ion exchange resin is a cation exchange resin.

7. Method of removing photographic waste water foulants from an anion exchange column, said method consisting of adding a three percent aqueous solution of hydrogen peroxide to the column and removing the reaction products from the column.

* * * * *